United States Patent
Lee et al.

(10) Patent No.: US 11,349,959 B1
(45) Date of Patent: May 31, 2022

(54) DELAYED NODE UPGRADE IN DISTRIBUTED SYSTEMS

(71) Applicant: EMC IP Holding Company LLC, Hopkinton, MA (US)

(72) Inventors: Gene W. Lee, Seattle, WA (US); Mark Ranger, Seattle, WA (US); Douglas Kilpatrick, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/479,415

(22) Filed: Sep. 20, 2021

(51) Int. Cl.
*H04L 67/00* (2022.01)
*G06F 9/4401* (2018.01)
*H04L 41/00* (2022.01)

(52) U.S. Cl.
CPC .......... *H04L 67/34* (2013.01); *G06F 9/4416* (2013.01); *H04L 41/20* (2013.01)

(58) Field of Classification Search
CPC ........ H04L 67/34; H04L 41/20; G06F 9/4416
See application file for complete search history.

(56) References Cited

U.S. PATENT DOCUMENTS

| | | | | |
|---|---|---|---|---|
| 7,890,664 B1 * | 2/2011 | Tao | ............. | G06F 9/4411 710/62 |
| 9,239,715 B1 * | 1/2016 | Jaisinghani | ............. | H04L 67/34 |
| 10,936,300 B1 * | 3/2021 | Sun | ............. | G06F 16/2365 |
| 10,938,660 B1 * | 3/2021 | Kapur | ............. | H04L 41/0659 |
| 2011/0099266 A1 * | 4/2011 | Calder | ............. | H04L 41/5041 709/224 |
| 2013/0054682 A1 * | 2/2013 | Malik | ............. | H04L 45/563 709/203 |
| 2014/0215486 A1 * | 7/2014 | DeRosa | ............. | G06F 9/5088 718/105 |
| 2014/0337825 A1 * | 11/2014 | Challa | ............. | G06F 8/71 717/168 |
| 2014/0359593 A1 * | 12/2014 | Cohen | ............. | G06F 8/65 717/169 |
| 2016/0092203 A1 * | 3/2016 | Filali-Adib | ............. | G06F 8/656 717/171 |
| 2018/0217825 A1 * | 8/2018 | Schneider | ............. | G06F 8/61 |
| 2019/0012161 A1 * | 1/2019 | Miernik | ............. | G06F 8/65 |
| 2022/0027247 A1 * | 1/2022 | Vengurlekar | ............. | G06F 11/3072 |

* cited by examiner

*Primary Examiner* — Blake J Rubin
(74) *Attorney, Agent, or Firm* — Amin, Turocy & Watson, LLP

(57) ABSTRACT

Delayed node upgrade in distributed systems is described herein. A method as described herein can include halting first client disconnections associated with a reboot operation of a file system update at a first computing node of a computing cluster in response to the first computing node being added to a delay list; causing, in further response to the first computing node being added to the delay list, second client disconnections associated with the reboot operation of the file system update at a second computing node of a group of second computing nodes of the computing cluster that are distinct from the first computing node; clearing, in response to the file system update being completed at respective ones of the group of second computing nodes, the delay list; and restarting, in response to clearing the delay list, the first client disconnections at the first computing node.

20 Claims, 11 Drawing Sheets

DELAYED NODE UPGRADE IN DISTRIBUTED SYSTEMS

BACKGROUND

Software updates in a distributed computing system, such as file system or operating system update, can be performed as a rolling upgrade in which respective nodes of the distributed system are upgraded one at a time in sequence. A rolling upgrade can be desirable, for example, to minimize the number of nodes of the distributed system that are unavailable due to upgrades at any given time. Additionally, in a distributed system in which respective nodes of the system are divided into multiple distinct failure domains, a parallel upgrade can be performed by concurrently performing rolling upgrades within each of the respective failure domains of the system in a single procedure.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an implementation, a data storage system is described herein. The data storage system can include a memory that stores executable components and a processor that executes the executable components stored in the memory. The executable components can include an upgrade initiation component that instructs a first computing node of the data storage system to close respective first client connections to the first computing node in preparation for a system reboot operation of a file system upgrade at the first computing node. The executable components can further include a drain delay component that, in response to the first computing node being added to a delay list, causes the upgrade initiation component to stop instructing the first computing node to close the respective first client connections and further causes the upgrade initiation component to instruct a second computing node, of a group of second computing nodes of the data storage system, to close respective second client connections to the second computing node in preparation for the system reboot operation of the file system upgrade at the second computing node. The executable components can additionally include a drain restart component that, in response to the file system upgrade being completed at respective ones of the group of second computing nodes, clears the delay list and causes the upgrade initiation component to re-instruct the first computing node to close the respective first client connections in preparation for the system reboot operation.

In another implementation, a method is described herein. The method can include halting, by a system operatively coupled to a processor, first client disconnections associated with a reboot operation of a file system update at a first computing node of a computing cluster in response to the first computing node being added to a delay list. The method can also include causing, by the system in further response to the first computing node being added to the delay list, second client disconnections associated with the reboot operation of the file system update at a second computing node of a group of second computing nodes of the computing cluster that are distinct from the first computing node. The method can further include clearing, by the system in response to the file system update being completed at respective ones of the group of second computing nodes, the delay list. The method can additionally include restarting, by the system in response to clearing the delay list, the first client disconnections associated with the reboot operation of the file system update at the first computing node.

In an additional implementation, a non-transitory machine-readable medium including computer executable instructions is described herein. The instructions, when executed by a processor of a data storage system, can facilitate performance of operations including, in response to a first computing node of a computing system being added to a delay list, causing the first computing node to discontinue dropping first client connections to the first computing node in preparation for a system reboot associated with a file system update; in further response to the first computing node being added to the delay list, causing a second computing node, of a group of second computing nodes of the computing system that are distinct from the first computing node, to initiate dropping second client connections to the second computing node in preparation for the system reboot associated with the file system update; clearing the delay list in response to the file system update being completed at respective ones of the group of second computing nodes; and, in response to clearing the delay list, causing the first computing node to re-initiate dropping the first client connections to the first computing node in preparation for the system reboot associated with the file system update.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring subject matter.

Figure 1:
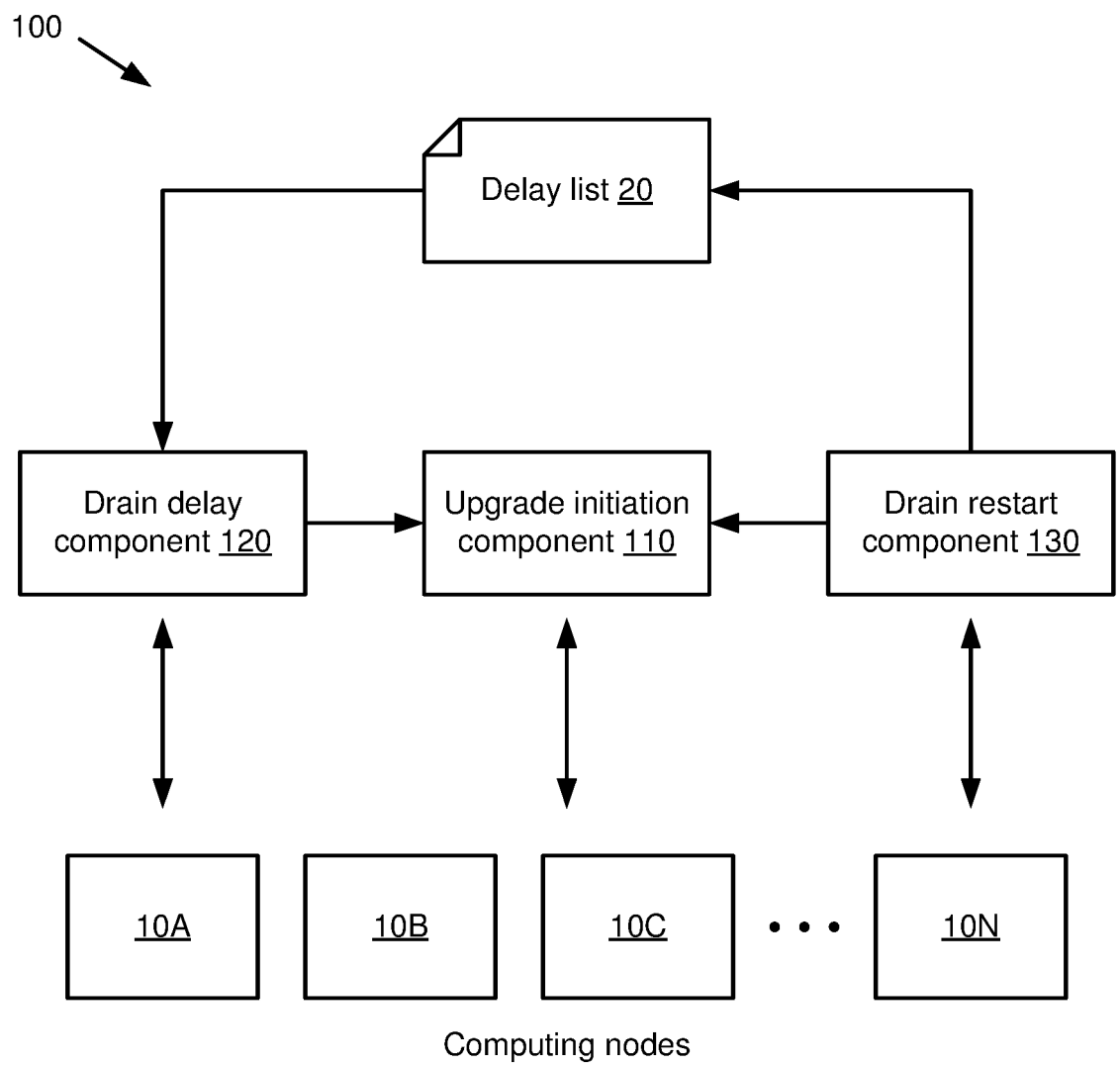
FIG. 1 is a block diagram of a system that facilitates delayed node upgrade in distributed systems in accordance with various implementations described herein.

With reference now to the drawings, FIG. 1 illustrates a block diagram of a system 100 that facilitates delayed node upgrade in distributed systems in accordance with various implementations described herein. As shown in FIG. 1, system 100 includes an upgrade initiation component 110, a drain delay component 120, and a drain restart component 130, which can operate as described in further detail below. In an implementation, the components 110, 120, 130 of system 100 can be implemented in hardware, software, or a combination of hardware and software. By way of example, the components 110, 120, 130 can be implemented as computer-executable components, e.g., components stored on a memory and executed by a processor. An example of a computer architecture including a processor and a memory that can be used to implement the components 110, 120, 130, as well as other components as will be described herein, is shown and described in further detail below with respect to FIG. 11.

As further shown in FIG. 1, the components 110, 120, 130 of system 100 can interact with respective computing nodes 10 of a distributed computing system, here N nodes 10A-10N. While the computing nodes 10 shown in FIG. 1 are labeled sequentially, e.g., 10A, 10B, etc., it is noted that the naming convention used for the computing nodes 10 is not intended to imply a specific number of computing nodes associated with system 100. Instead, it is noted that system 100 can be associated with any suitable number of computing nodes 10, including two computing nodes and/or more computing nodes. Additionally, while the computing nodes 10 shown in system 100 are logically distinct and are illustrated as distinct entities, it is noted that the respective computing nodes 10 need not be physically distinct. For instance, some or all of the computing nodes 10 associated with system 100 could be housed by a common physical chassis and/or other apparatus despite being logically separate system nodes. Alternatively, respective ones of the computing nodes 10 could be located in different physical devices.

In an implementation, the components 110, 120, 130 can be implemented at one or more of the computing nodes 10 of system 100. Also or alternatively, the components 110, 120, 130 can be implemented via one or more computing devices that are separate from the computing nodes 10 and communicate with the computing nodes 10 via any suitable wired or wireless communication technology. Other implementations of the components 110, 120, 130 are also possible.

In an implementation as shown by FIG. 1, the respective computing nodes 10 of system 100 can communicate with each other over a backend network associated with system 100 and/or any other suitable interconnection between the respective computing nodes 10. Additionally, communications between the computing nodes 10 of system 100 can be conducted via a data transport protocol, e.g., the Transmission Control Protocol (TCP), User Datagram Protocol (UDP), or the like. Other techniques for facilitating communication between the computing nodes 10 of system 100 could also be used.

Inter-node communications between the computing nodes 10 of system 100, e.g., as described above, can be used to facilitate rolling upgrade functionality for the respective computing nodes 10 of system 100. In general, a rolling upgrade enables respective nodes of a distributed computing system to be upgraded sequentially, e.g., such that only one node, or a defined number of nodes, is unavailable due to system upgrade operations (e.g., a system reboot and/or other event(s) that render a node unavailable for processing client requests) at a time. In an implementation, the number of nodes that can be unavailable at a given time can be chosen based on a data storage and/or redundancy scheme utilized by system 100, e.g., such that a sufficient number of nodes remain available at all times to prevent loss of access to data stored by system 100. In an implementation in which the computing nodes 10 of system 100 are divided into multiple failure domains, rolling upgrades as described herein can occur in parallel within each failure domain of the system. As used herein, the term "parallel upgrade" refers to an implementation in which node upgrades occur within multiple failure domains concurrently. Parallel upgrades are described in further detail below, e.g., with respect to FIGS. 6-7.

In the event of a system upgrade to the computing nodes 10 that necessitates a system reboot (e.g., due to changes to the file system, operating system, or other major software components of the computing nodes 10 that cannot be completed while the computing nodes 10 are operational), respective ones of the computing nodes 10 can be selected for rebooting in sequence, e.g., by the upgrade initiation component 110 as described below. In response to a computing node 10 being selected to reboot for a system upgrade, the computing node 10 can shut down its associated protocol services. However, to reduce disruptions (e.g., data unavailability, connection failure, etc.) to clients that are connected to a computing node 10 being upgraded, the computing node 10 can be configured to stop services and reboot only once all clients have disconnected from that computing node 10. The process of closing client connections to a given computing node 10 prior to rebooting the computing node 10 to complete a system upgrade is referred to herein as "draining."

As a result of the above, it is desirable to wait until the draining process is complete at a given computing node 10, e.g., the number of active client connections to the computing node 10 drops to zero, before rebooting the computing node 10 to finish a system upgrade. However, in a system in which only one computing node 10 per failure domain can be unavailable at a time, no other computing nodes 10 in the same failure domain as a draining computing node 10 can be prepared for a system reboot until after the draining computing node 10 finishes the draining process and restarts. This can result in significant delays, e.g., on the order of days to weeks, in upgrading the computing nodes 10 of the system in some cases. This is of particular significance in cases in which one or more computing nodes 10 of the system are running long-duration, high-priority computing tasks that cannot be interrupted without adverse consequences (e.g., a final effects rendering for a motion picture with an imminent release date, etc.).

To mitigate delays to other computing nodes 10 in the system due to the above circumstances, respective computing nodes 10 can be placed on a delay list 20 as shown in system 100, e.g., during the draining process for said computing nodes 10. As a result of a computing node 10 being placed on the delay list 20, the upgrade process can be deferred for that computing node 10, and a new computing node 10 can begin the upgrade process as if the upgrade process had completed at the original computing node 10. Example techniques for managing and using a delay list 20 are described in further detail below with respect to FIG. 9.

With reference now to the components 110, 120, 130 of system 100, the upgrade initiation component 110 of system 100 can instruct a first computing node 10A of system 100 to close or drop client connections to the first computing node 10A, e.g., in preparation for a system reboot operation of a system upgrade at the first computing node 10A.

In response to the first computing node 10A being added to the delay list 20, e.g., due to a high-priority computing task running on the first computing node 10A, the drain delay component 120 of system 100 can cause the upgrade initiation component 110 to stop instructing the first computing node 10A to close or drop client connections and/or otherwise halt client disconnections from the first computing node 10A. The drain delay component 120 can further respond to the first computing node 10A being added to the delay list 20 by causing the upgrade initiation component 110 to instruct a second computing node 10B, e.g., a second computing node 10B of a group of second computing nodes 10B-10N in system 100, to close or drop client disconnections to the second computing node 10B in preparation for the system reboot operation of the system upgrade at the second computing node 10B. Stated another way, in response to the first computing node 10A being added to the delay list 20, the drain delay component 120 can facilitate a draining process for a system upgrade at another computing node 10B instead of the first, delayed computing node 10A.

Once all computing nodes 10 of system 100 either have completed the system upgrade process or have been delayed via placement on the delay list 20, the computing node(s) 10 that have been placed on the delay list 20 can safely be removed from the delay list 20 without adversely impacting other computing nodes 10. Accordingly, the drain restart component 130 of system 100 can respond to the system upgrade being completed at respective ones of the second computing nodes 10B-10N, e.g., non-delayed computing nodes of the second computing nodes 10B-10N, by clearing the delay list 20 and causing the upgrade initiation component 110 to re-instruct the first computing node 10A to close or drop its client connections in preparation for the system reboot operation.

Turning next to FIGS. 2-5, and with further reference to FIG. 1, respective example operations that can be performed during a rolling upgrade for a cluster of four computing nodes 10A-10D are illustrated. While the operations shown in FIGS. 2-5 can be managed by the components 110, 120, 130 of system 100, only the components actively involved in a given step are illustrated in FIGS. 2-5 for simplicity of illustration. Additionally, it is noted that while FIGS. 2-5 illustrate an example in which four computing nodes 10A-10D are present, similar techniques to those shown in FIGS. 2-5 could also apply to clusters or systems containing any number of computing nodes 10. It is further noted that similar techniques to those described below with respect to FIGS. 2-5 for a rolling upgrade could be extended to a parallel upgrade, e.g., by performing the operations shown in FIGS. 2-5 for multiple failure domains concurrently.

Figure 2:
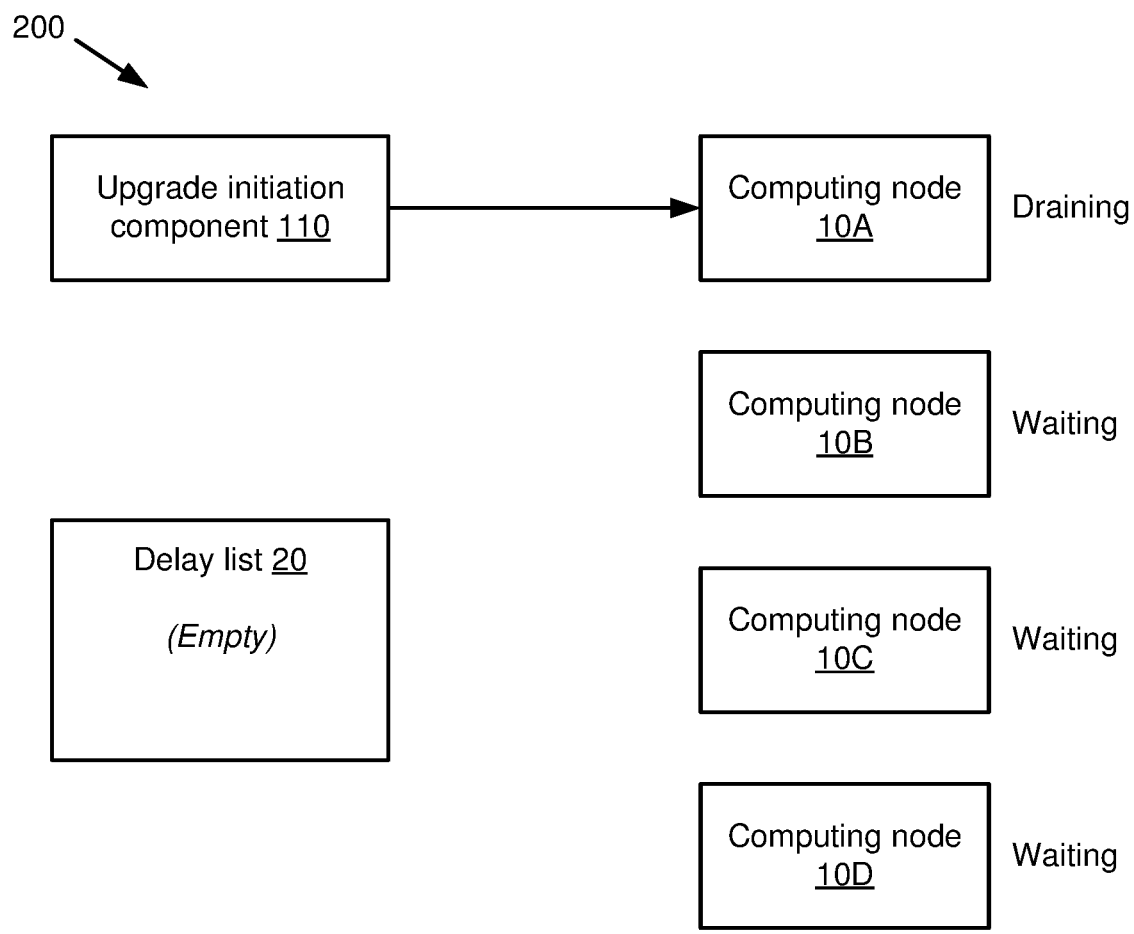
FIGS. 2-5 are diagrams depicting respective operations that can be performed to facilitate delayed node upgrade in a distributed system in accordance with various implementations described herein.
Figure 3:
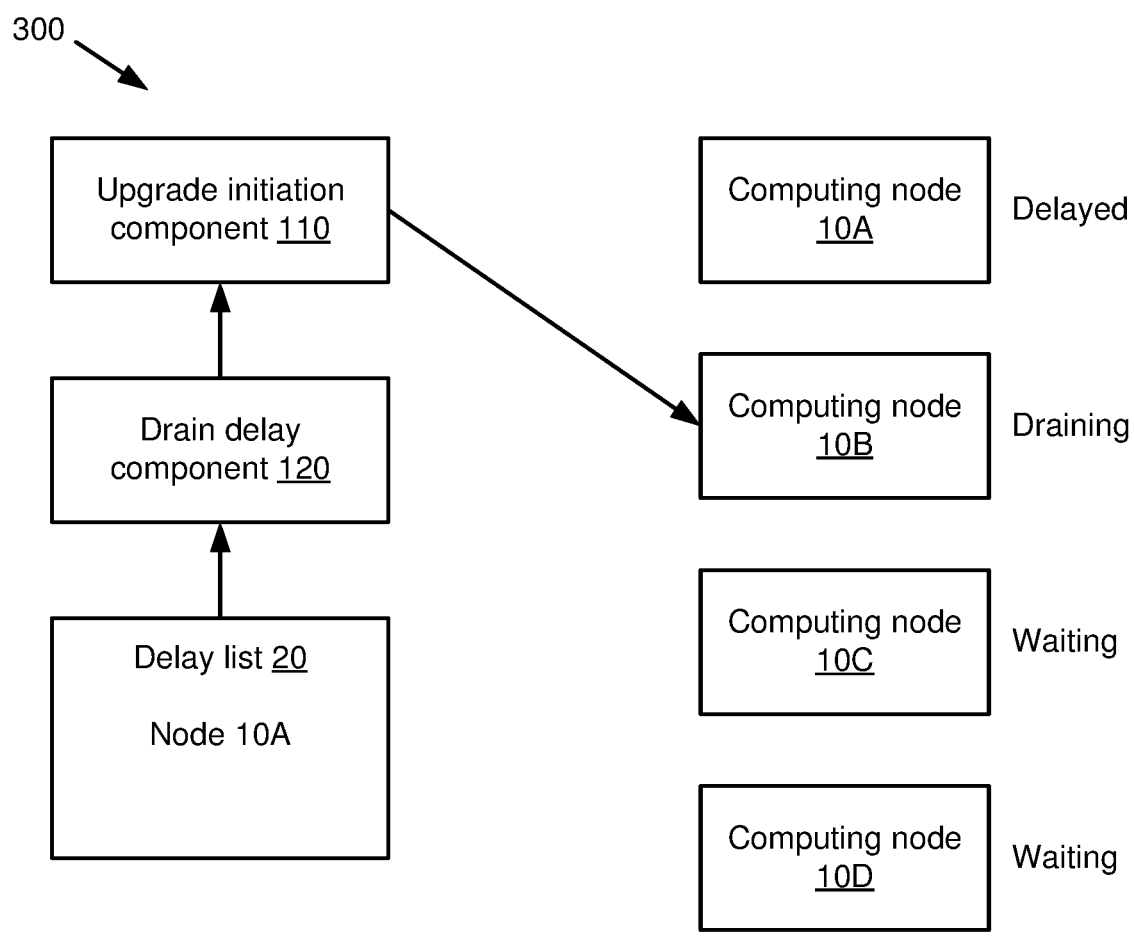

With reference now to FIG. 2, diagram 200 illustrates an initial stage of an example rolling upgrade. As noted above, during an upgrade of a computing cluster, each node in the cluster can be rebooted as part of the upgrade in order to enable those nodes to begin running the upgraded version of their associated system software. Further, to preserve distributed file system access during the upgrade, the upgrade software, e.g., as managed by the upgrade initiation component 110, can restrict the number of concurrently rebooting nodes to one (or one per failure domain for a system with multiple failure domains). Additionally, to prevent disruption to clients connected to a node that is about to reboot during an upgrade, the upgrade software can wait for these clients to drain away, e.g., disconnect from the node before rebooting.

Due to the limitation that only one node in a given failure domain can be in a draining state at a given time, the upgrade initiation component 110 shown in diagram 200 can instruct a single one of the computing nodes 10, here computing node 10A, to begin draining. In an implementation, a computing node 10 can be selected by the upgrade initiation component 110 for draining based on any suitable selection technique, e.g., round robin selection, random or pseudo-random selection, statistics-based selection, or the like. Also or alternatively, each of the computing nodes 10 can contend with each other to enter the draining state, and the upgrade initiation component 110 can select a computing node 10 based on a result of that contention, e.g., such that the computing nodes 10 are selected on a first come, first served basis and/or by other means. As further shown in diagram 200, until the draining computing node 10A has rebooted, the other nodes 10B-10D in the cluster can enter a waiting state pending permission being given by the upgrade initiation component 110 to initiate their own reboot.

While computing node 10A is in the draining state, the upgrade initiation component 110 can be configured to prevent new client connections to computing node 10A until that node exits the draining state, e.g., by completing the system upgrade or being placed on the delay list 20. For instance, the upgrade initiation component 110 can cause a load balancer or other client routing mechanisms associated with the cluster to cease directing new client connections to the address of computing node 10A until the draining process is completed or suspended at computing node 10A.

Since computing node 10A as shown in diagram 200 is the first node of the cluster to enter the draining state, the delay list 20 is initially empty. As further shown by diagram 300 in FIG. 3, in the event that one or more clients are connected to computing node 10A and are unable to seamlessly failover to another node, e.g., due to performing a high-priority, long-lived job that cannot be interrupted, the client connection count for computing node 10A will remain at a nonzero value until the conclusion of that job. In the meantime, computing node 10A cannot reboot, and the other computing nodes 10B-10D in the cluster will remain in the waiting state indefinitely. In order to prevent this delay and enable the other computing nodes 10B-10D in the cluster to reboot and upgrade, computing node 10A can be added to the delay list 20. In an implementation, computing node 10A can be added to the delay list 20 via a delay command issued by a system administrator or other system user (e.g., via a user interface as described in more detail below with respect to FIG. 9), and/or by other appropriate means.

In response to computing node 10A being added to the delay list 20 as shown by diagram 300, the drain delay component 120, via the upgrade initiation component 110, can cause computing node 10A to stop draining in order to allow another computing node, here computing node 10B, to start draining in preparation for a system reboot in its place. In an implementation, computing node 10B can be selected for draining in a similar manner to the initial selection of computing node 10A as described above. Additionally, while computing node 10A remains on the delay list 20, computing node 10A can be temporarily removed from the upgrade loop associated with the cluster. As a result, new client connections can be routed to computing node 10A while it remains on the delay list 20, e.g., as if the upgrade process was not active.

Figure 4:
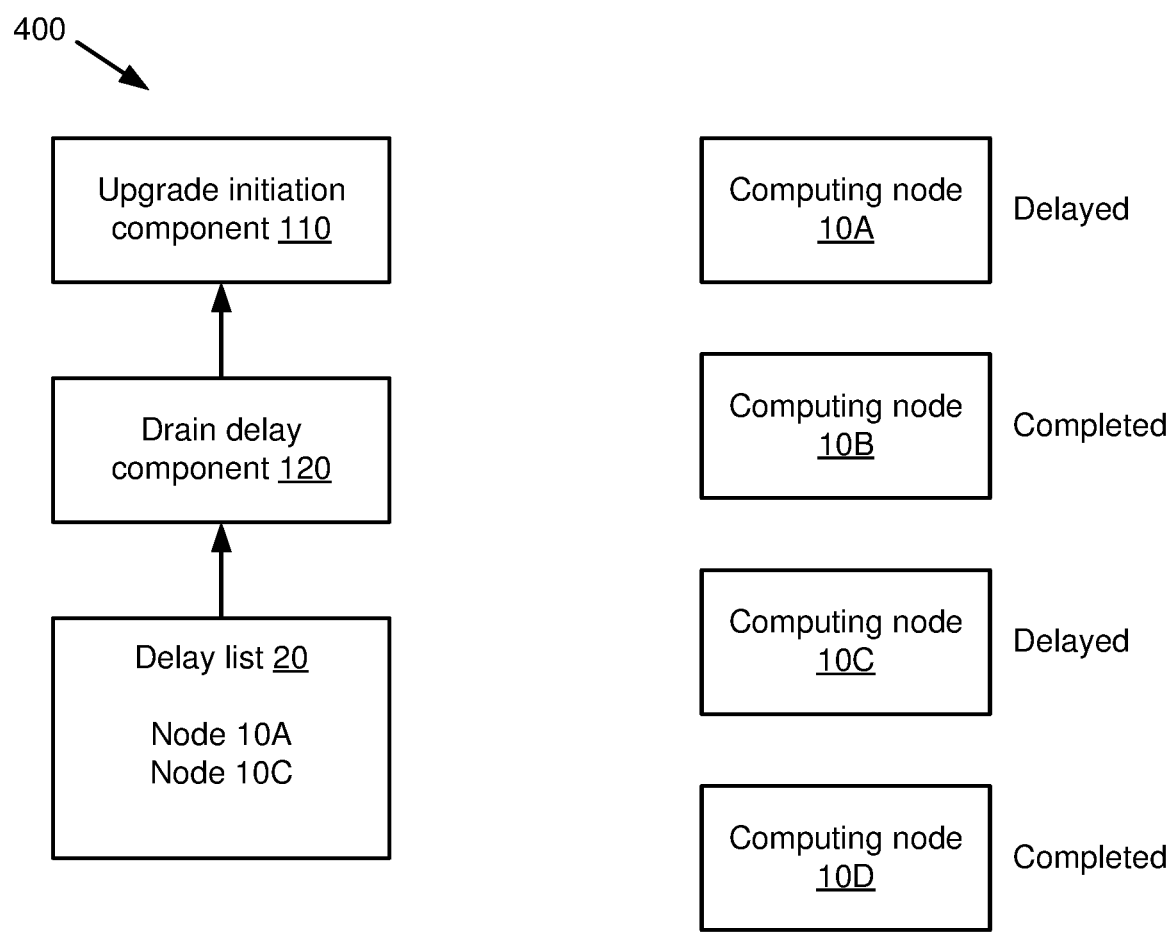
Figure 5:
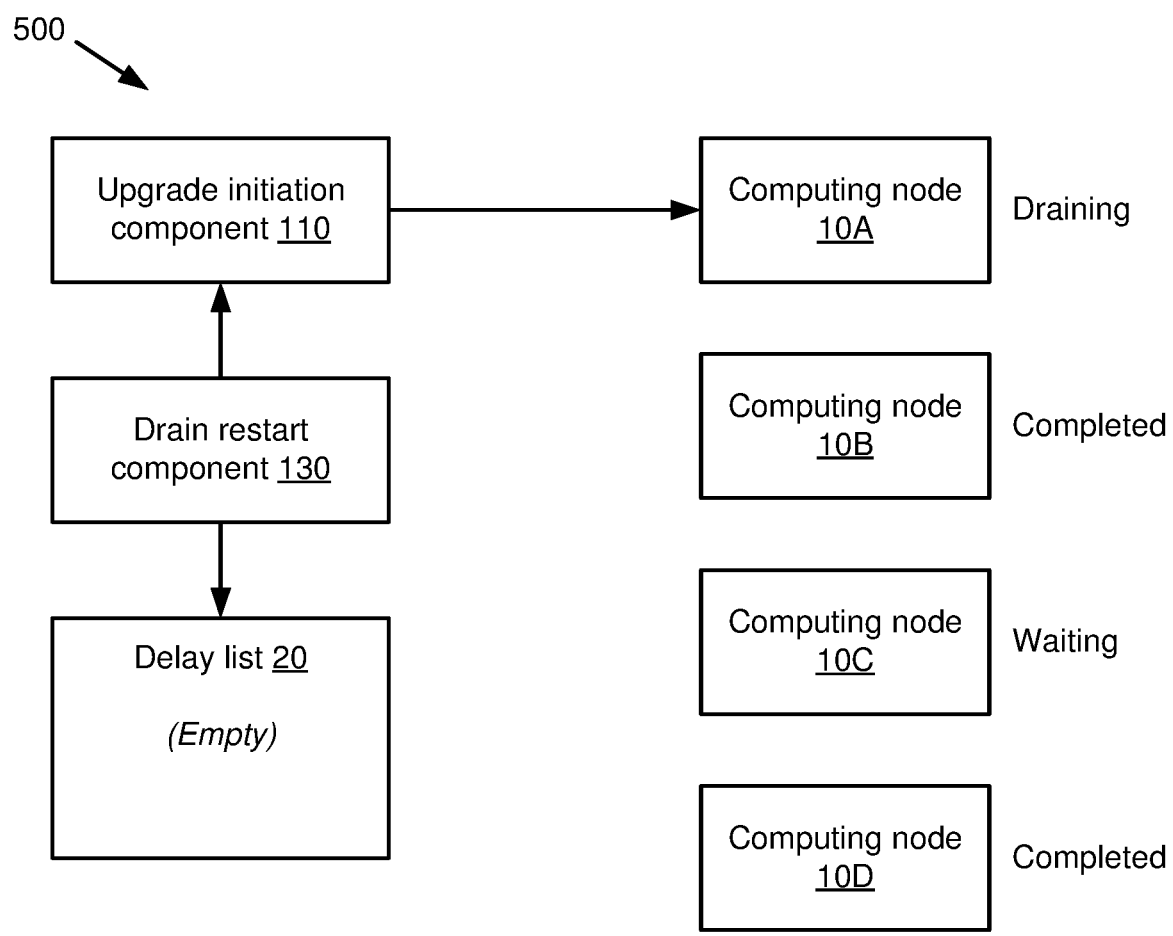

In an implementation, each computing node 10 of the cluster can be selected for draining in the manner shown above with respect to FIGS. 2-3 until all of the computing nodes 10 have either completed the system upgrade or been added to the delay list 20. Diagram 400 in FIG. 4 illustrates the state of the cluster containing computing nodes 10A-10D after an initial pass by the upgrade initiation component 110. In the example shown by diagram 400, computing nodes 10B and 10D successfully completed the system upgrade, while computing nodes 10A and 10C were delayed, e.g., as described above with respect to FIG. 2.

Since all non-delayed nodes have successfully completed the system upgrade at the time shown by diagram 400, the delayed nodes can again enter the draining state without adversely impacting other nodes. Accordingly, as further shown by diagram 500 in FIG. 5, the drain restart component 130 can remove delayed computing nodes 10A and 10C from the delay list 20 and cause the upgrade initiation component 110 to again instruct one of the delayed computing nodes, here computing node 10A, to drop or close client connections, and/or to restart or resume client disconnections, in a similar manner to that described above with respect to FIG. 2. It is noted that one or more computing tasks running at the delayed computing nodes 10A and 10C that caused said nodes to be placed on the delay list 20 could still be active at this time. However, because all non-delayed nodes have been upgraded at the stage shown by diagram 500, the upgrade initiation component 110 can allow the delayed computing nodes 10A and 10C to fully perform their associated computing tasks before rebooting without causing delays to the other nodes.

Figure 6:
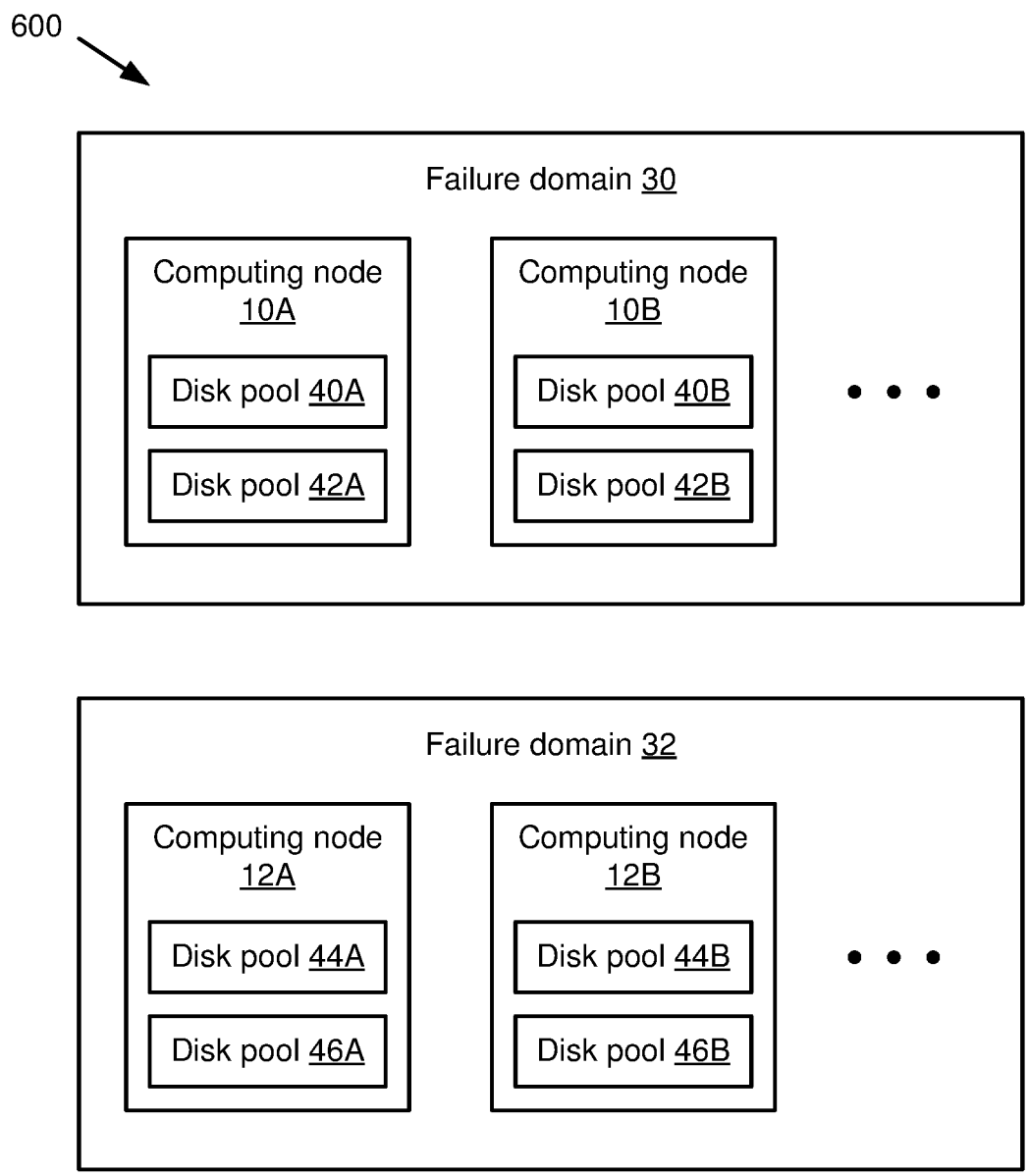
FIG. 6 is a diagram depicting an example failure domain structure that can be utilized by various implementations described herein.

Turning next to FIG. 6, a diagram 600 depicting an example failure domain structure that can be utilized by various implementations described herein is illustrated. Repetitive description of like elements that are employed in other embodiments described herein is omitted for brevity. As shown by diagram 600, respective computing nodes 10, 12 of a distributed computing cluster can be split up into respective failure domains 30, 32, which are logical divisions of the computing nodes 10, 12 that serve to protect data stored by the computing nodes 10, 12 from disk failure and/or other causes of data loss. It is noted that while the failure domains 30, 32 shown in diagram 600 represent logical divisions of computing nodes 10, 12, the failure domains 30, 32 do not represent physical divisions. Instead, computing nodes 10, 12 sharing common hardware, such as a physical chassis, a Peripheral Component Interconnect (PCI) bridge, or the like, can be placed in different failure domains 30, 32 to mitigate the impact of hardware failure on the availability of data stored by the system. Additionally, in order to reduce the exposure of data stored by the system to potential data loss, each computing node 10, 12 of the system can be assigned to exactly one failure domain 30, 32.

In the example shown by diagram 600, first computing nodes 10 are respectively associated with a first failure domain 30, while second computing nodes 12 are respectively associated with a second, different failure domain 32. While the example shown in diagram 600 includes two failure domains 30, 32, it is noted that a distributed computing system can have any suitable number of failure domains 30, 32, each of which can include any number of computing nodes 10, 12. As further shown by diagram 600, the storage drives (e.g., hard disk drives, solid state drives, etc.) associated with each computing node 10, 12 can be further divided into respective disk pools 40-46. In an implementation, division of drives into respective disk pools 40-46 can be based on indexes or other identifiers assigned to the respective drives at each computing node 10, 12. By way of a non-limiting example in which each computing node 10 in failure domain 30 contains ten drives indexed from 1 through 10, respectively, the drives at each computing node 10 having indexes 1-5 can be placed into first disk pools 40, while the drives with indexes 6-10 can be placed into second disk pools 42. A similar grouping can be utilized to place drives at respective computing nodes 12 in failure domain 32 into disk pools 44 and 46.

In an implementation, blocks of data to be written at the system shown by diagram 600, e.g., in a write transaction, can be written at drives of the system corresponding to a given disk pool 40-46 at a given failure domain 30, 32. By doing so, data loss within the system can be limited to cases in which a threshold number of drives within a specific disk pool 40-46 fail. The probability of such an event can be significantly less than that of a failure of the threshold number of drives anywhere in the system, which could result in data loss in implementations in which data is assigned to drives within the system randomly.

Figure 7:
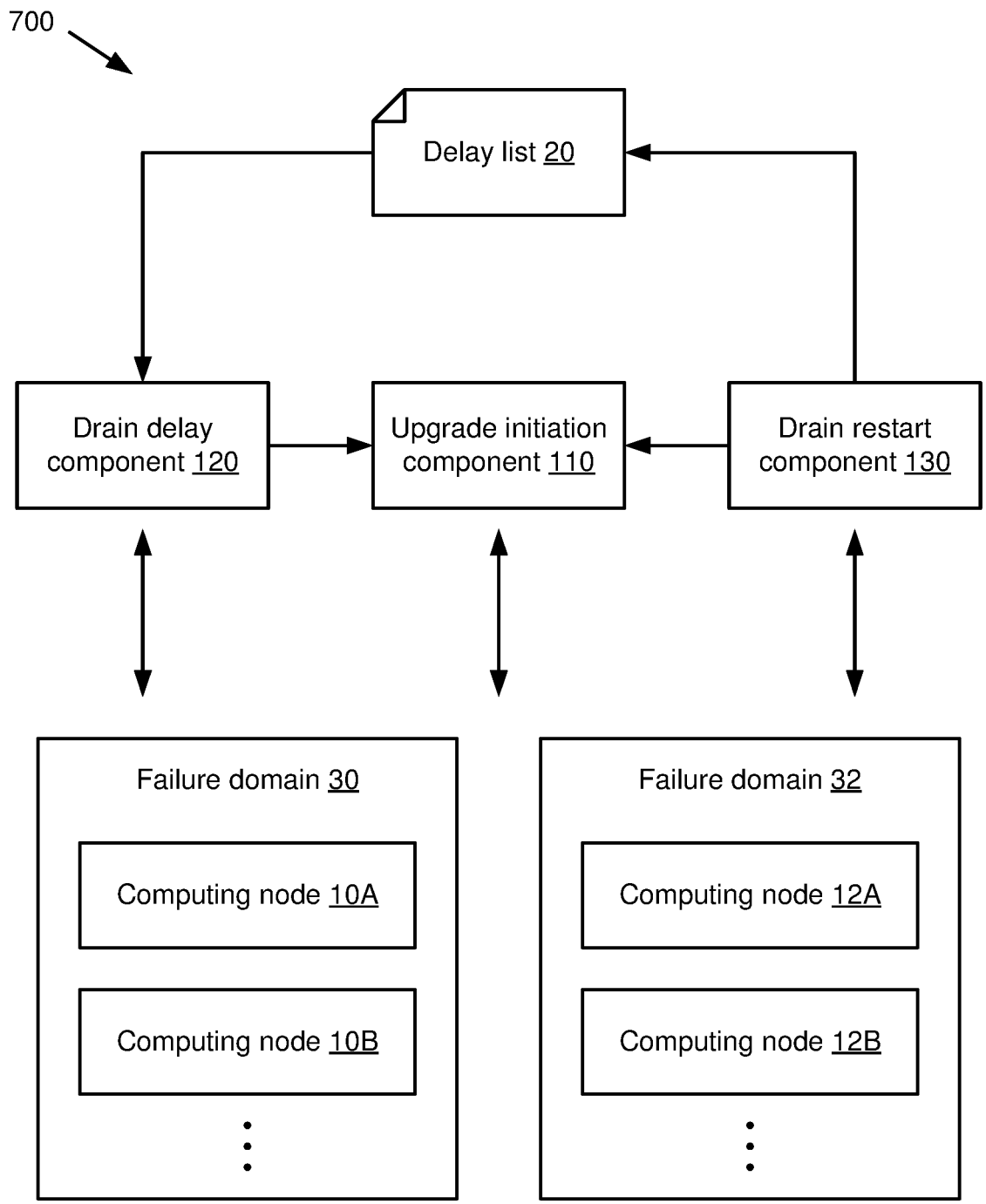
FIG. 7 is a block diagram a system that facilitates delayed node upgrade in a distributed system with multiple failure domains in accordance with various implementations described herein.

With reference now to FIG. 7, a block diagram of a system 700 that facilitates delayed node upgrade in a distributed system with multiple failure domains 30, 32 is illustrated. Repetitive description of like elements that are employed in other embodiments described herein is omitted for brevity. In an implementation, system 700 as shown by FIG. 7 can be utilized as an extension of system 100 as described above in order to facilitate a parallel upgrade across failure domains 30 and 32, e.g., by performing a rolling upgrade of the computing nodes 10 of failure domain 30 in parallel with a rolling upgrade of the computing nodes 12 of failure domain 32. The respective rolling upgrades performed within failure domains 30 and 32 can proceed, e.g., as described above with respect to FIGS. 2-5. While only two failure domains 30, 32 are shown in FIG. 7, it is noted that a parallel upgrade could be performed in a similar manner across any suitable number of failure domains.

By leveraging multiple failure domains 30, 32 as shown in FIG. 7, system 700 can decrease the time associated with system upgrades to each computing node 10, 12 in system 700 by enabling one computing node 10, 12 from each failure domain 30, 32 to be rebooted at a time in parallel without causing data unavailability. Thus, for example, while the upgrade initiation component 110 causes a first computing node 10A in a first failure domain 30 to close client connections in connection with a system reboot, the upgrade initiation component 110 can cause a second computing node 12A in a second failure domain 30 to close client connections concurrently with closing the client connections at the first computing node 10A.

Figure 8:
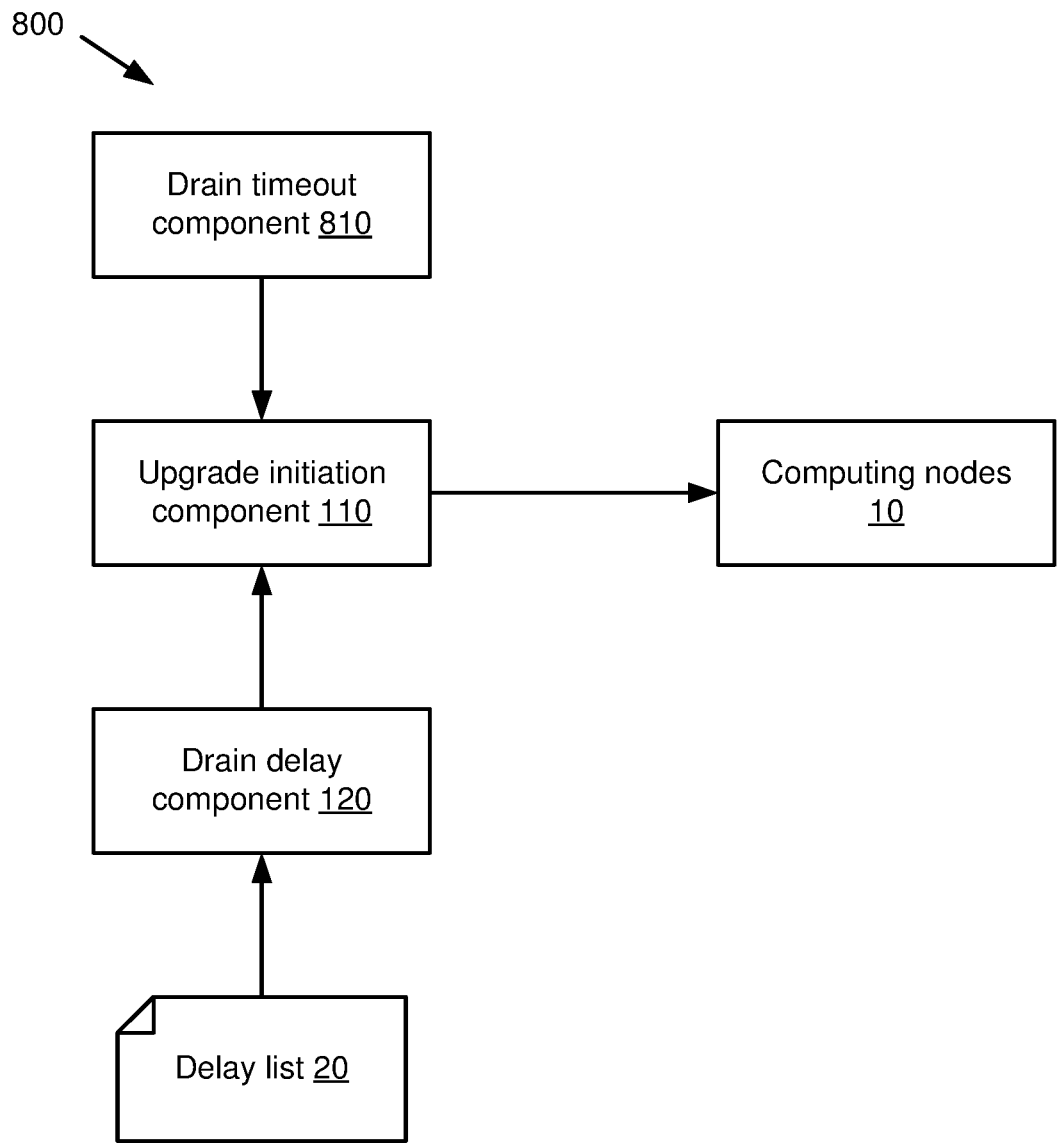
FIG. 8 is a block diagram of a system that facilitates drain timeouts for nodes in a distributed system in accordance with various implementations described herein.

Turning now to FIG. 8, a block diagram of a system 800 that facilitates drain timeouts for computing nodes 10 in a distributed system is illustrated. Repetitive description of like elements that are employed in other embodiments described herein is omitted for brevity. System 800 as shown in FIG. 8 includes a drain timeout component 810, which can force a system reboot operation associated with a system upgrade at a given computing node 10, e.g., even before all client connections at the computing node 10 are closed, in response to expiration of a drain timeout interval.

In an implementation, the drain timeout interval can be specified (e.g., by a system administrator or other user) at the start of an upgrade, or alternatively a default value or other system-defined value could be used. Regardless of the way in which a drain timeout interval is initially set, the interval can be configured such that it can be modified an administrator or other entity during the upgrade. In another implementation, the drain timeout value can be set to a value of infinity, in which case a computing node 10 will never restart until it has completed draining. In an implementation in which a finite drain timeout interval is used, the addition of a computing node 10 onto the delay list 20 can toll the interval or otherwise prevent the drain timeout component 810 from forcing a system reboot at that computing node 10, e.g., pending removal of the computing node 10 from the delay list 20.

Figure 9:
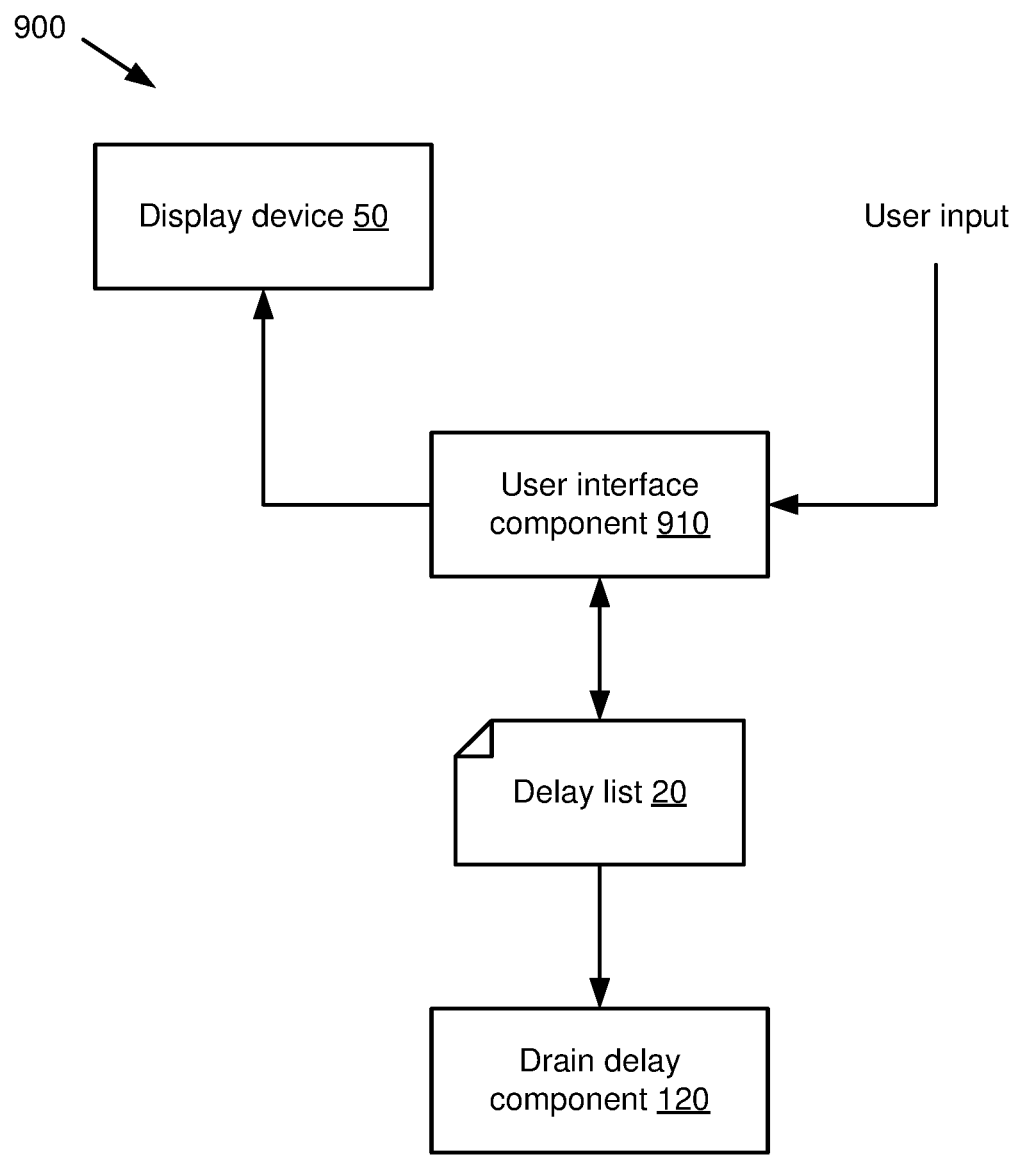
FIG. 9 is a block diagram of a system that facilitates a user interface for management of node upgrades in a distributed system in accordance with various implementations described herein.

With reference to FIG. 9, a block diagram of a system 900 that facilitates a user interface for management of node upgrades in a distributed system is illustrated. Repetitive description of like elements that are employed in other embodiments described herein is omitted for brevity. As shown in FIG. 9, system 900 includes a user interface component 910 that can provide user input/output functionality for the delay list 20 as described above and/or its implementation.

In an implementation, the user interface component 910 can render information relating to the delay list 20 to a display device 50 associated with system 900. For instance, the user interface component 910 can utilize a graphical user interface (GUI) (e.g., WebUI or the like) and/or a command line interface (CLI) to display nodes that have been added to the delay list 20 as "delayed." In addition, the interface provided via the user interface component 910 can enable a system administrator or other user to provide input to system 900, such as to manually add system nodes to the delay list 20.

The user interface component 910 can also at least partially automate some operations performed with respect to the delay list 20. For instance, instead of relying on a user to run a manual command to remove a node from the delay list, the user interface component 910 can automatically determine that all of the nodes that can be upgraded (e.g., all of the nodes not present on the delay list 20) have done so and automatically clear the delay list 20 as a result. The interface provided by the user interface component 910 would then no longer show any nodes as delayed, and the previously delayed nodes can then be instructed, e.g., as described above with respect to FIG. 5, to restart draining and upgrading.

Figure 10:
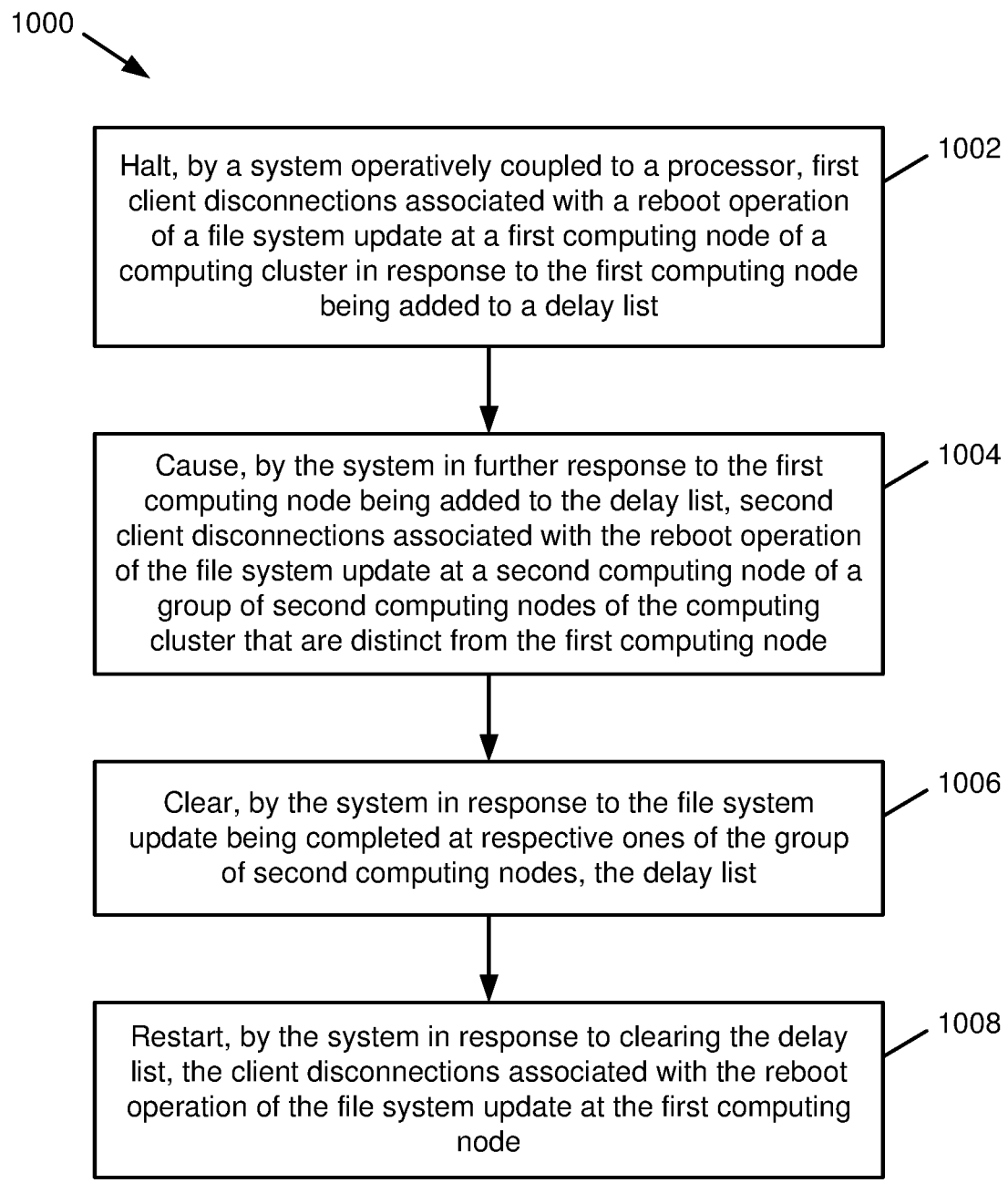
FIG. 10 is a flow diagram of a method that facilitates delayed node upgrade in distributed systems in accordance with various implementations described herein.

Referring next to FIG. 10, a flow diagram of a method 1000 that facilitates delayed node upgrade in distributed systems in accordance with various implementations described herein is illustrated. At 1002, a system operatively coupled to a processor can halt (e.g., by a drain delay component 120) first client disconnections associated with a reboot operation of a file system update (e.g., as initiated by an upgrade initiation component 110) at a first computing node (e.g., computing node 10A) of a computing cluster in response to the first computing node being added to a delay list (e.g., a delay list 20).

At 1004, the system can cause (e.g., by the upgrade initiation component 110), in further response to the first computing node being added to the delay list at 1002, second client disconnections associated with the reboot operation of the file system update at a second computing node (e.g., computing node 10B) of a group of second computing nodes of the computing cluster that are distinct from the first computing node.

At 1006, in response to the file system update being completed at respective ones of the group of second computing nodes, the system can clear (e.g., by the drain restart component 130) the delay list. Subsequently, at 1008, the system can restart (e.g., by the drain restart component 130 and/or the upgrade initiation component 110) the client disconnections halted at 1002, e.g., client disconnections associated with the reboot operation of the file system update at the first computing node.

FIG. 10 as described above illustrates a method in accordance with certain embodiments of this disclosure. While, for purposes of simplicity of explanation, the method has been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain embodiments of this disclosure.

Figure 11:
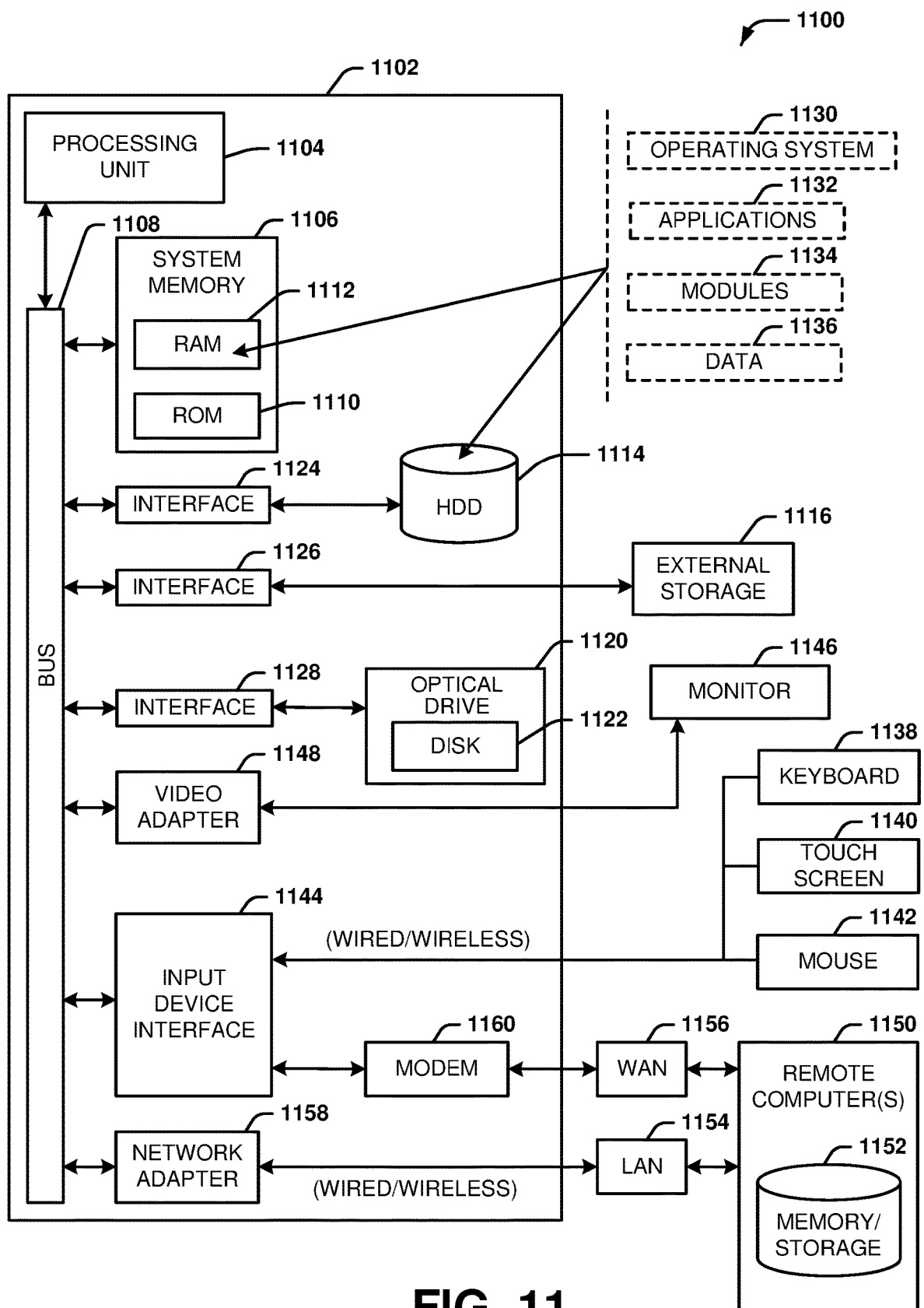
FIG. 11 is a diagram of an example computing environment in which various embodiments described herein can function.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD), a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any embodiment or design described herein as "exemplary" and/or "demonstrative" is not necessarily to be construed as preferred or advantageous over other embodiments or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A data storage system, comprising:
a memory that stores executable components; and
a processor that executes the executable components stored in the memory, wherein the executable components comprise:
an upgrade initiation component that instructs a first computing node of the data storage system to close respective first client connections to the first computing node in preparation for a system reboot operation of a file system upgrade at the first computing node;
a drain delay component that, in response to the first computing node being added to a delay list, causes the upgrade initiation component to stop instructing the first computing node to close the respective first client connections and further causes the upgrade initiation component to instruct a second computing node, of a group of second computing nodes of the data storage system, to close respective second client connections to the second computing node in preparation for the system reboot operation of the file system upgrade at the second computing node; and
a drain restart component that, in response to the file system upgrade being completed at respective ones of the group of second computing nodes, clears the delay list and causes the upgrade initiation component to re-instruct the first computing node to close the respective first client connections in preparation for the system reboot operation.

2. The data storage system of claim 1, wherein the drain delay component, in response to the second computing node of the group of second computing nodes being added to the delay list, causes the upgrade initiation component to stop instructing the second computing node to close the respective second client connections, resulting in the second computing node being a delayed computing node and respective other computing nodes of the group of second computing nodes being non-delayed computing nodes.

3. The data storage system of claim 2, wherein the drain restart component, in response to the file system upgrade being completed at the non-delayed computing nodes of the group of second computing nodes, further causes the upgrade initiation component to re-instruct the second computing node to close the respective second client connections in preparation for the system reboot operation.

4. The data storage system of claim 1, wherein the first computing node and the group of second computing nodes are respectively associated with a first failure domain of the data storage system.

5. The data storage system of claim 4, wherein the upgrade initiation component further instructs a third computing node, associated with a second failure domain of the data storage system that is distinct from the first failure domain, to close respective third client connections to the third computing node in preparation for the system reboot operation of the file system upgrade at the third computing node concurrently with closing the respective first client connections to the first computing node.

6. The data storage system of claim 1, wherein the executable components further comprise:
a drain timeout component that forces the system reboot operation of the file system upgrade at the second computing node, irrespective of the second client connections to the second computing node, in response to expiration of a defined time interval.

7. The data storage system of claim 6, wherein the drain delay component, in response to the second computing node being added to the delay list, prevents the drain timeout component from forcing the system reboot operation of the file system upgrade at the second computing node pending removal of the second computing node from the delay list.

8. The data storage system of claim 1, wherein the executable components further comprise:
a user interface component that renders information relating to the delay list to a display device associated with the data storage system.

9. The data storage system of claim 1, wherein the upgrade initiation component prevents new client connections to the first computing node while instructing the first computing node to close the respective first client connections to the first computing node.

10. A method, comprising:
halting, by a system operatively coupled to a processor, first client disconnections associated with a reboot operation of a file system update at a first computing node of a computing cluster in response to the first computing node being added to a delay list;
causing, by the system in further response to the first computing node being added to the delay list, second client disconnections associated with the reboot operation of the file system update at a second computing node of a group of second computing nodes of the computing cluster that are distinct from the first computing node;
clearing, by the system in response to the file system update being completed at respective ones of the group of second computing nodes, the delay list; and
restarting, by the system in response to clearing the delay list, the first client disconnections associated with the reboot operation of the file system update at the first computing node.

11. The method of claim 10, further comprising:
halting, by the system in response to the second computing node being added to the delay list, the second client disconnections associated with the reboot operation of the file system update at the second computing node, resulting in the second computing node being a delayed computing node and respective other computing nodes of the group of second computing nodes being non-delayed computing nodes.

12. The method of claim 11, wherein the restarting comprises, in further response to clearing the delay list, restarting the second client disconnections associated with the reboot operation of the file system update at the second computing node.

13. The method of claim 10, wherein the first computing node and the group of second computing nodes are respectively associated with a first failure domain of the computing cluster.

14. The method of claim 13, further comprising:
initiating, by the system, third client disconnections associated with the reboot operation of the file system update at a third computing node, associated with a second failure domain of the computing cluster that is distinct from the first failure domain, concurrently with the first client disconnections at the first computing node.

15. The method of claim 10, further comprising:
preventing, by the system in response to restarting the first client disconnections at the first computing node, new client connections to the first computing node.

16. A non-transitory machine-readable medium comprising computer executable instructions that, when executed by a processor of a data storage system, facilitate performance of operations, the operations comprising:
in response to a first computing node of a computing system being added to a delay list, causing the first computing node to discontinue dropping first client connections to the first computing node in preparation for a system reboot associated with a file system update;
in further response to the first computing node being added to the delay list, causing a second computing node, of a group of second computing nodes of the computing system that are distinct from the first computing node, to initiate dropping second client connections to the second computing node in preparation for the system reboot associated with the file system update;
clearing the delay list in response to the file system update being completed at respective ones of the group of second computing nodes; and
in response to clearing the delay list, causing the first computing node to re-initiate dropping the first client connections to the first computing node in preparation for the system reboot associated with the file system update.

17. The non-transitory machine-readable medium of claim 16, wherein the operations further comprise:
in response to the second computing node being added to the delay list, causing the second computing node to discontinue dropping the second client connections to the second computing node, resulting in the second computing node being a delayed computing node and respective other computing nodes of the group of second computing nodes being non-delayed computing nodes.

18. The non-transitory machine-readable medium of claim 17, wherein the operations further comprise:
in further response to clearing the delay list, causing the second computing node to re-initiate dropping the second client connections to the second computing node in preparation for the system reboot associated with the file system update.

19. The non-transitory machine-readable medium of claim 16, wherein the first computing node and the group of second computing nodes are respectively associated with a first failure domain of the computing system.

20. The non-transitory machine-readable medium of claim 19, wherein the operations further comprise:
causing a third computing node, associated with a second failure domain of the computing system that is distinct from the first failure domain, to initiate dropping third client connections to the third computing node in parallel with causing the second computing node to initiate dropping the second client connections to the second computing node.

* * * * *